US012668332B2

(12) United States Patent (10) Patent No.: US 12,668,332 B2
Carlsen (45) Date of Patent: Jun. 30, 2026

(54) ROV OPERATED HOT STAB

(71) Applicant: Oceaneering International, Inc.,
Houston, TX (US)

(72) Inventor: Torleif Carlsen, Sandnes (NO)

(73) Assignee: Oceaneering International, Inc.,
Houston, TX (US)

( * ) Notice: Subject to any disclaimer, the term of this
patent is extended or adjusted under 35
U.S.C. 154(b) by 542 days.

(21) Appl. No.: 18/219,307

(22) Filed: Jul. 7, 2023

(65) Prior Publication Data

US 2024/0010305 A1 Jan. 11, 2024

Related U.S. Application Data

(60) Provisional application No. 63/359,668, filed on Jul.
8, 2022.

(51) Int. Cl.
*B63B 27/30* (2006.01)
*B63G 8/00* (2006.01)
*F16L 1/26* (2006.01)

(52) U.S. Cl.
CPC .............. *B63B 27/30* (2013.01); *B63G 8/001*
(2013.01); *F16L 1/26* (2013.01); *B63G*
*2008/005* (2013.01)

(58) Field of Classification Search
None
See application file for complete search history.

(56) References Cited

U.S. PATENT DOCUMENTS

| | | | | |
|---|---|---|---|---|
| 4,682,913 A * | 7/1987 | Shatto | ................... | F16L 37/002 |
| | | | | 166/344 |
| 4,695,190 A * | 9/1987 | Best | ...................... | E21B 33/038 |
| | | | | 405/169 |
| 6,009,950 A * | 1/2000 | Cunningham | ........ | E21B 33/038 |
| | | | | 166/347 |
| 7,243,729 B2 * | 7/2007 | Tyrrell | ................ | E21B 33/0385 |
| | | | | 251/30.01 |
| 7,806,187 B2 * | 10/2010 | Lugo | ........................ | E21B 41/04 |
| | | | | 166/347 |
| 8,985,219 B2 * | 3/2015 | Cruden | .................. | E21B 33/038 |
| | | | | 166/341 |
| 9,243,462 B2 * | 1/2016 | Gutierrez | ................ | E21B 19/16 |
| 9,297,470 B2 * | 3/2016 | Hodnefjell | ............ | F16K 27/065 |
| 9,822,613 B2 * | 11/2017 | Crawford | .............. | E21B 43/013 |
| 10,774,620 B2 * | 9/2020 | Johnson | .................. | E21B 41/04 |

* cited by examiner

*Primary Examiner* — Aaron L Lembo
(74) *Attorney, Agent, or Firm* — Maze IP Law, P.C.

(57) ABSTRACT

A remotely operated vehicle (ROV) operated fluid stab
system for subsea fluid transfer comprises a connector with
seal protection and multiple fluid ports, typically more than
six fluid ports, to enable multiple flow combinations, both
high- and low flow. The connector is relatively short and
guide friendly to ease the stabbing operation. The seal is held
in place by a nut/threaded insert that is threaded into the stab
body.

20 Claims, 6 Drawing Sheets

Spiral cover for hoses

Hoses directed away from body before bundled in spiral cover

Close          Open 306
304
309
303
308
307

10
60

ROV OPERATED HOT STAB

BACKGROUND

Hot stabs are remotely operated vehicle (ROV) operated connectors for subsea fluid transfer between ROV power sources and subsea equipment. Current hot stab solutions have one to six fluid ports and are circular with a long length compared to their diameter, resulting in a large, exposed unit prone to damage, increased bending stresses, and a procedure requiring inserting the long male stab into a female receptacle. Stabbing can be difficult due to the limited depth vision of ROVs. The long stab also needs an almost equally long receptacle, driving the size on ROV tooling, panels, and ROV parking, in addition to requiring more delicate maneuvering of an ROV manipulator. Problems with stabbing also lead to increased wear due to adhesion between sliding surfaces which again results in galling, where the material of the male and female parts adhere or friction welds to each other.

Typically, different stabs are needed to carry out specific tasks and multiple stabs are often needed. If the operation e.g., requires both cleaning of subsea equipment and then pressurizing multiple cylinders; one first flow stab with a jet nozzle is needed for cleaning and one or two additional hot stabs can be required to serve the equipment.

FIGURES

Various figures are included herein which illustrate aspects of embodiments of the disclosed inventions.

DESCRIPTION OF EXEMPLARY EMBODIMENTS

As used herein, "first fluid flow" is a predetermined fluid flow having a first fluid rate, and "second fluid flow" is a predetermined fluid flow having a second flow rate which is less than the first flow rate. As more fully described herein, the remotely operated vehicle (ROV) operated fluid stab has 6 or more fluid ports to enable multiple flow combinations, both first- and second flow.

Figure 1:
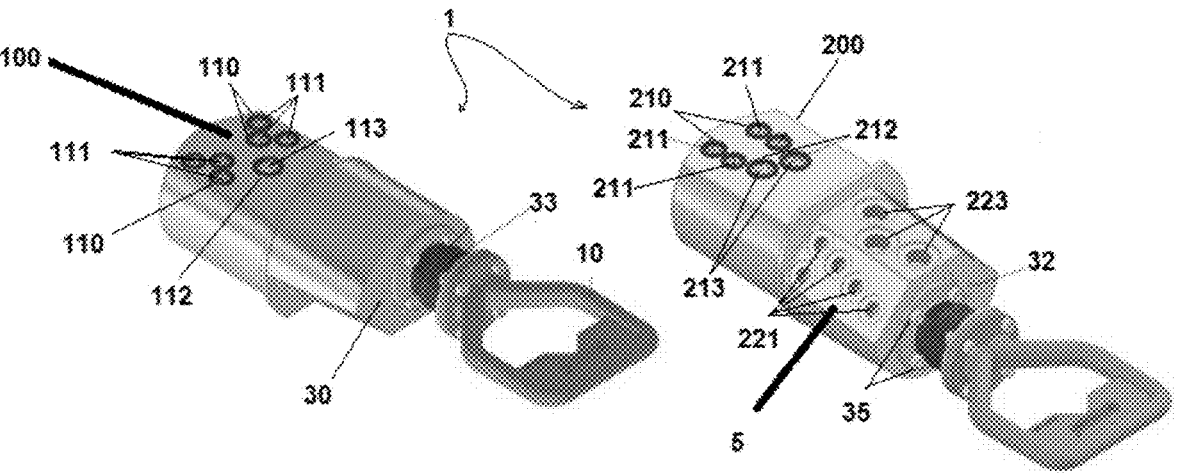
FIG. 1 is a view from two sides of an exemplary stab in partial perspective.
Figure 3:
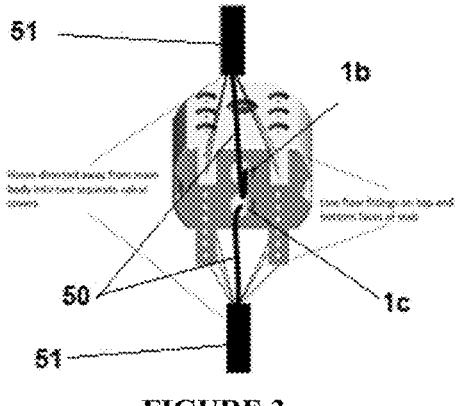
FIG. 3 is a view from a facing side an exemplary stab in partial perspective.
Figure 4:
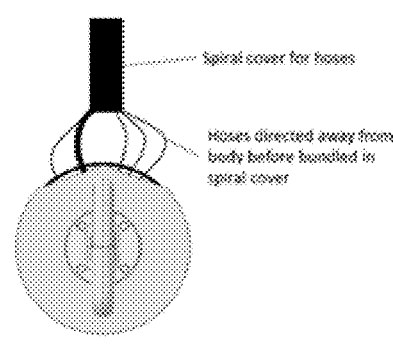
FIG. 4 is a view from a facing side of an exemplary stab in partial perspective showing fluid line connections.
Figure 14:
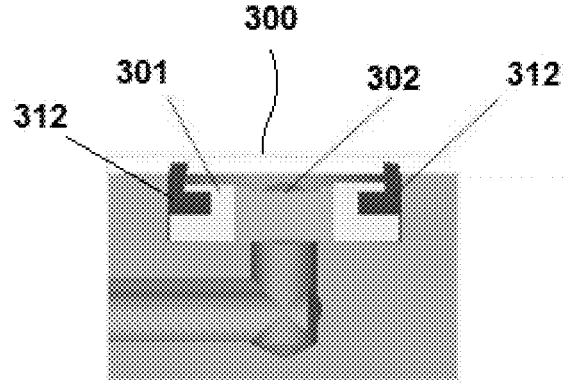
FIG. 14 is a cutaway view in of a check seal showing various components.

In a first embodiment, referring generally to FIG. 1, a remotely operated vehicle (ROV) operated fluid stab is adapted for subsea fluid transfer and comprises a multipurpose fluid stab, an ROV operated fluid connection system (e.g., a predetermined set of cables 50 (FIG. 3)), and seal protector 300 (FIG. 14).

Figure 9:
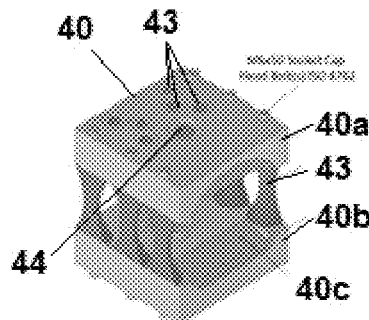
FIG. 9 is a view in partial perspective of a fluid connector receptacle.
Figure 15:
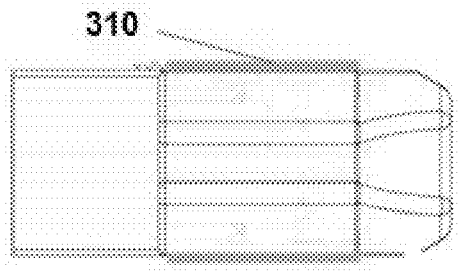
FIG. 15 is a view showing a sliding spring-loaded protection cover.
Figure 16:
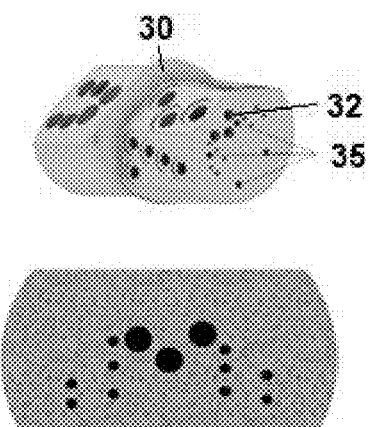
FIG. 16 is a further view of an exemplary stab.

The multipurpose fluid stab comprises stab body 1 is configured to be removably docked into fluid receptacle 40 (FIG. 9). Stab body 1 comprises first surface 100; second surface 200; a set of stab body threaded receivers 110, 112 extending from first surface 100 into stab body 1; a corrosion-resistant alloy material; corrosion protection; a predetermined length; receptacle entry end 2 which, in embodiments, may be flat or tapered or otherwise and defines tapered receptacle entry end 2a (FIG. 2); leading portion 1a, comprising receptacle entry end 2 (FIG. 2); internal fluid annulus 1b (FIG. 3) and fluid annulus 1c (FIG. 3) extending through a predetermined portion of an interior of stab body 1 and each having a port proximate an exterior, exposed portion of leading portion 1a (FIG. 2); trailing portion 5 connected to leading portion 1a; a predetermined set of first flow flat face ports 223, typically at least three, disposed at an outer surface of trailing portion 5; a predetermined set of first flow internal fluid ports 212 disposed between the outer surface of leading portion 1a and leading portion internal fluid annulus 1b, where each first flow internal fluid port 212 is typically in fluid communication with a corresponding first flow flat face port 223; a predetermined set of second flow flat face ports 221, typically at least ten, disposed at the outer surface of trailing portion 5; a set of second flow internal fluid ports 210 disposed between the outer surface of leading portion 1a and leading portion internal fluid annulus 1c, where each second flow internal fluid port 210 is typically in fluid communication with a corresponding second flow flat face port 221; a predetermined set of check seals 111, 113 configured to act as one or more check valves and corresponding face seals in a single unit, each check seal 111, 113 disposed at least partially within the set of stab body threaded receivers 110, 112; plug 32 disposed proximate to and secured to trailing portion 5 of stab body 1 proximate second flow internal fluid port 221 disposed proximate trailing portion 5, where plug 32 is configured to occlude fluid flow through second flow internal fluid port 221; ROV handle 10, typically non-axially-centrally connected to trailing portion 5 with respect to a diameter of trailing portion 5 to avoid intersection between bolt hole 35, a subset of the predetermined first set of first flow flat face ports and a subset of the predetermined first set of second flow flat face ports being typically disposed at the outer surface of trailing portion 5; flexible joint 33 disposed intermediate ROV handle 10 and plug 32; and rough surface protection cover 310 (FIG. 15). Flexible joint 33 and ROV handle 10 may be mounted on a bolted plate.

The plurality of fluid ports 210, 212, 221, 223 typically comprises a first set of first flow fluid ports 212, 223 and a first set of second-flow fluid ports 210, 221. In embodiments, the predetermined set of first flow flat face ports 223 comprises a predetermined set of first flow British Standard Parallel Pipe (BSPP) flat face ports 223 and the predetermined set of second flow flat face ports 221 comprises a predetermined set of second flow BSPP flat face ports 221.

Figure 5:
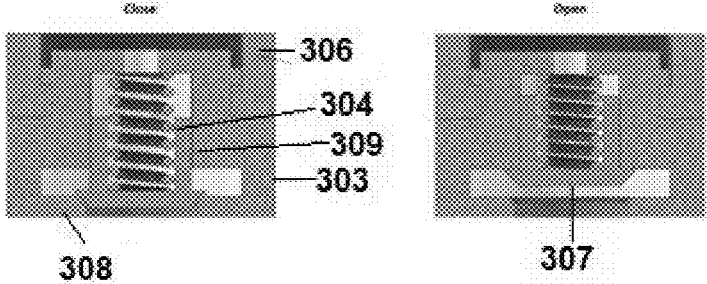
FIG. 5 is a cutaway view an exemplary check seal.
Figure 6:
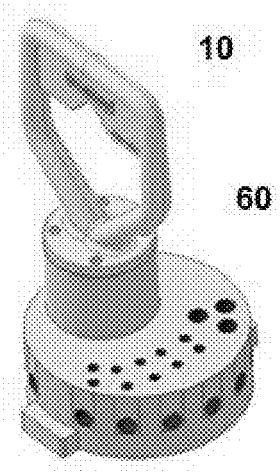
FIG. 6 is a view of a second exemplary stab in partial perspective.
Figure 7:
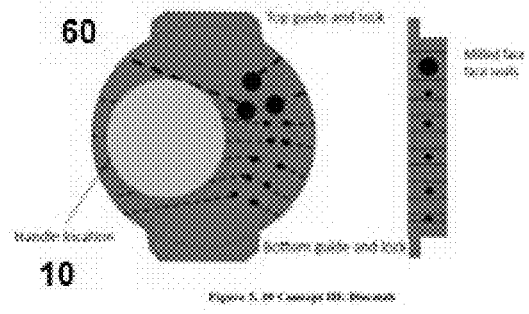
FIG. 7 is a planar view of the second exemplary stab.
Figure 8:
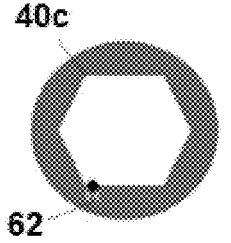
FIG. 8 is a planar view of a fluid connector receptacle.
Figure 12:
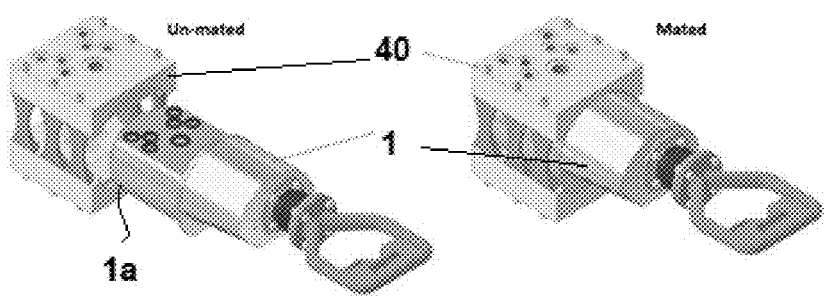
FIG. 12 is view in partial perspective of an exemplary stab and an exemplary fluid connector receptacle.
Figure 13:
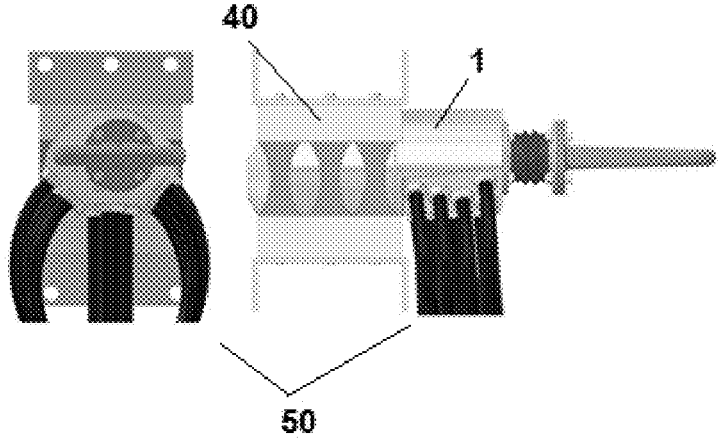
FIG. 13 are views in partial perspective of an exemplary stab and an exemplary fluid connector receptacle showing fluid connections.

Seal protector 300 (FIG. 14) generally comprises seal nut 301 comprising a predetermined set of internal threads to secure a complimentarily threaded check valve 302 and threaded insert 303 (FIG. 5) configured to be threaded into stab body threaded receiver 110, 112. Protection cover 310 (FIG. 15), typically spring loaded, may also be present and, if present, typically comprises spring-loaded sleeve 311 (FIG. 14) configured to slide over seal 312 which is protected by the seal protector 300 and shield it from external forces when not docked in fluid receptacle 40 (FIG. 12). Typically, seal protector 300 is adapted to ensure that seal 312 protected by seal protector 300 cannot move. Spring-loaded protection cover 310 may comprise a partial cover or a whole cover.

The remotely operated vehicle ROV operated fluid stab for subsea fluid transfer may further comprise an indicator corresponding to a successful stab operation.

Referring now generally to FIG. 12, remotely operated vehicle ROV operated fluid stab system for subsea fluid transfer comprises the multipurpose fluid stab, as described above, and fluid connector receptacle 40 which is configured to allow leading portion 1a of stab body 1 to be selectively docked into and undocked from fluid connector receptacle 40 and typically comprises fluid connector receptacle tapered entry 40c (FIG. 9).

Stab body 1 also further typically comprises flange 30 (FIG. 1), which comprises a predetermined geometric shape usable to guide an orientation of a stabbing operation by separating "up" and "down" orientations. Flange 30 geometric shape may comprise a nonsymmetric shape.

Figure 2:
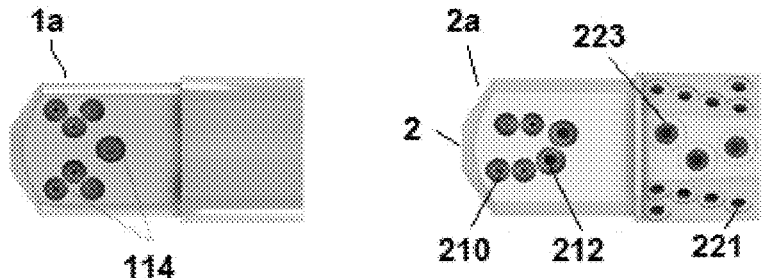
FIG. 2 is a view from an upper and a lower side of an exemplary stab in partial perspective.

In embodiments, trailing portion 5 (FIG. 1) is rotatably connected to leading portion 1a (FIG. 2).

Fluid connector receptacle 40 (FIG. 9) may be adapted to use a cathodic probe (CP).

If most embodiments, the predetermined set of check seals 111, 113, which comprise or otherwise defines check valve 302 (FIG. 14), are typically mounted in the plurality of fluid ports 110, 112 and adapted to prevent intrusion of water into the system when not pressurized and leakage of hydraulic fluids into surroundings when pressurized. Typically, at least one check seal 111, 113 of the predetermined set of check seals 111, 113 comprises housing 303 (FIG. 5) fastened to an outside of check seal 111, 113 to constrain it to stab body 1; spring 303 (FIG. 5) disposed within housing 303 and adapted to assist in closing check seals 111, 113 and enable installation in an upside-down position; face seal 308 (FIG. 5) adapted to mate against and/or with stab body 1; receptacle seal 306 (FIG. 5) adapted to mate to fluid receptacle 40 (FIG. 9); at least one pin guide 309 (FIG. 5) (typically, four pin guides 309) configured to help ensure correct mating; spring 304 (FIG. 5); and pin 307 (FIG. 5) disposed within housing 305, typically comprising a cone shape to progressively throttle fluid flow to prevent pressure surges. Face seal 308 may comprise a compressible material that compresses when stab body 1 (FIG. 1) is mated. Receptacle seal 308 may be configured to provide necessary friction to hold stab body 1 in place. Housing 303 preferably comprises a hexagonally shaped head for installation and removal.

Figure 10:
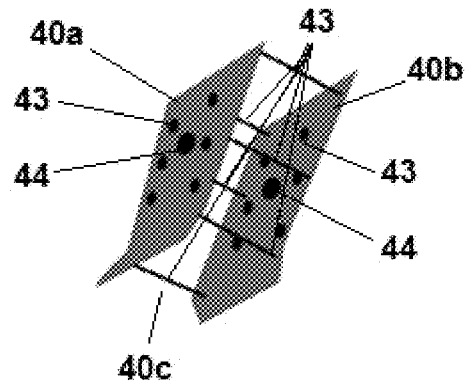
FIG. 10 is a view in partial perspective of a fluid connector receptacle.
Figure 11:
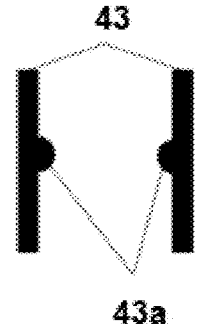
FIG. 11 is a planar view of seals of a fluid connector receptacle.

In embodiments, referring now to FIG. 9 and FIG. 10, fluid connector receptacle 40 comprises first plate 40a comprising a set of receptacle fluid ports 43, 44 configured to align with the predetermined first set of first flow flat face ports 223 (FIG. 1) and the predetermined second set of second flow flat face ports 221 (FIG. 1); a second plate 40b comprising a set of receptacle fluid ports configured to align with the predetermined first set of first flow flat face ports 223 and the predetermined second set of second flow flat face ports 221; a predetermined set of spacers 43 disposed intermediate, and connected to, the first plate and the second plate, first plate 40a and second plate 40b defining a tapered entry to guide 40c and ease a stabbing operation, the predetermined set of spacers 43 comprising a set of radial seals 43a (FIG. 11) in a center spacer 43 adapted to guide a stabbing operation and push back a surface cover such as protection cover 310 (FIG. 15). If present, first plate 40a and second plate 40b typically define a 15° tapered entry.

In embodiments, referring back to FIG. 1, the set of first flow internal fluid ports 212 comprises at least three first flow internal fluid ports 212 and the set of second flow internal fluid ports 210 comprises at least ten second flow internal fluid ports 210. In embodiments, stab body 1 comprises a hexagonal shape and fluid connector receptacle 40 (FIG. 9) comprises an inverse geometry of stab body 1 and tapered entry 40c (FIG. 9). In certain embodiments, fluid connector receptacle 40 further comprising spring-loaded ball lock adapted to hold stab body 1 in place; and an open back (FIG. 9) adapted to prevent hydro-locking. In contemplated embodiments, stab body 1 (FIG. 1) is adapted to achieve roughness average ("Ra") 1.6 at surfaces mating with fluid connector receptacle 40 and stab body 1. In other contemplated embodiments, stab body 1 comprises UNS 520910 which is a nitrogen-strengthened austenitic stainless steel.

In contemplated embodiments, referring again to FIG. 9 and FIG. 10, fluid connector receptacle 40 is galling resistant with at least 1000 mate/demate cycles and comprises a pitting resistance equivalence number ("PREn") greater than 40, a cathodic protection connector, and super duplex stainless steel with a microstructure of 50:50 austenite and ferrite, e.g., UNS 532750.

It will be appreciated that first- and second flow fluid ports can be more than the double of existing solutions in the market and give operators the possibility of controlling subsea equipment with fewer hot stabs. This, combined with the relative short length of the stab and the tapered receptacle entry, may further assist in bringing down operational costs.

In most embodiments, the design is optimized for maintenance as check seal 111, 113 and fluid connector receptacle 40 may only need replacement of sub-components when damaged. Also, the flat face ports are located so that hose fittings can be removed individually without having to remove adjacent fittings to gain access.

In the operation of exemplary methods, referring back to FIG. 1 and FIG. 12, the remotely operated vehicle (ROV) operated fluid stab for subsea fluid transfer described herein above may be used by guiding stab body 1 by its tapered receptacle entry end 2 fluid connector receptacle 40; optionally using flange 30 to indicate that a successful stab depth is reached when flange 30 is parallel to a receptacle outer face; routing a predetermined set of cables 50 away from stab body 1 and into separate spiral covers 51 (FIG. 3); securing seal 312 (FIG. 14) in place by seal nut 301 (FIG. 14) that is threaded into stab body 1 where seal nut 301 comprises internal threads for check valve 302 (FIG. 14); and sliding spring-loaded protection cover 310 (FIG. 15) over seal 312 to shield seal 312 from external forces when stab body 1 is not docked in fluid connector receptacle 40. Tapered receptacle entry end 2 may comprise a rounded receptacle entry end.

Where a predetermined set of first flow internal fluid ports 212 and set of second flow internal fluid ports 210 exist, predetermined set of first flow internal fluid ports 212 and predetermined set of second flow internal fluid ports 210 may be placed into a predetermined position relative to each other whereby they can be drilled straight from a back face of stab body 1 and from center of the check seal bores. An entry line of predetermined set of first flow internal fluid ports 212 and predetermined set of second flow internal fluid ports 210 may be created by drilling perpendicular to the respective flat face port plane. Predetermined set of first flow internal fluid ports 212 and predetermined set of second flow internal fluid ports 210 may be routed in such a way that no drilling operation crosses one another. Once created, predetermined set of first flow internal fluid ports 212 and predetermined set of second flow internal fluid ports 210 may be plugged from the back face after the drilling operation is finished.

If fluid connector receptacle 40 comprises first plate 40a, comprising a set of receptacle fluid ports 43, 44 configured to align with predetermined set of first flow flat face ports 223 and predetermined set of second flow flat face ports 221, second plate 40b, comprising a set of receptacle fluid ports 43, 44 configured to align with predetermined set of first flow flat face ports 221 and the predetermined set of second flow flat face ports 221, a predetermined set of spacers 43 disposed intermediate, and connected to, first plate 40a and second plate 40b where first plate 40a and second plate 40b define tapered entry 40c to guide and ease a stabbing operation and where the predetermined set of spacers 43 comprise a set of radial seals 43a in a center spaces 43 adapted to guide a stabbing operation and push back a surface cover???, spacers 43 may be fitted with radial seals 43a and a predetermined number bolts used to fix the spacers 43 to connect the fluid connector receptacle 40 to the stab body 1. In embodiments, fluid receptacle connector 40 is open to prevent hydro locking when the predetermined number bolts are used to fix spacers 43 to connect fluid connector receptacle 40 to stab body 1.

Stab body 1 may be guided into fluid connector receptacle 40 by tapered receptacle entry end 2 to aid in minimizing a load of a stabbing operation.

In embodiments, flange 30 can be used to connect a potential surface cover and excess space is given between flange 30 and the check seals to make room for a surface cover to retract.

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. A remotely operated vehicle (ROV) operated fluid stab for subsea fluid transfer, comprising:
   a. a multipurpose fluid stab, comprising:
      i. a stab body configured to be removably docked into and out from a fluid receptacle, the stab body comprising:
         1. a first surface;
         2. a second surface disposed opposite the first surface;
         3. a set of stab body threaded receivers extending from the first surface into the stab body;
         4. a corrosion-resistant alloy material;
         5. a predetermined set of corrosion protections;
         6. a tapered receptacle entry end; and
         7. a predetermined set of internal fluid annuluses; and
      ii. a plurality of fluid ports disposed through a predetermined portion of the stab body from the first surface of the stab body through to the internal fluid annulus, the plurality of fluid ports comprising:

1. a first set of first fluid flow rate internal fluid ports configured for a first fluid flow rate; and
         2. a first set of second fluid flow rate internal fluid ports configured for a second fluid flow fluid rate which is less than the first fluid flow fluid rate;
   b. an ROV operated fluid connection system; and
   c. a seal protector, comprising:
      i. a seal nut comprising a predetermined set of internal threads to secure a complimentarily threaded check valve; and
      ii. a threaded insert configured to be threaded into a stab body threaded receiver of the set of stab body threaded receivers.

2. The remotely operated vehicle (ROV) operated fluid stab system for subsea fluid transfer of claim 1, wherein the plurality of fluid ports comprises at least six fluid ports.

3. The remotely operated vehicle (ROV) operated fluid stab system for subsea fluid transfer of claim 1, further comprising a spring-loaded protection cover, the spring-loaded protection cover comprising a spring-loaded sleeve configured to slide over a seal protected by the seal protector and shield it from external forces when not docked in the receptacle, the seal protector adapted to ensure that the seal protected by the seal protector cannot move.

4. The remotely operated vehicle (ROV) operated fluid stab system for subsea fluid transfer of claim 3, wherein the spring-loaded protection cover comprises at least a partial cover.

5. The remotely operated vehicle (ROV) operated fluid stab system for subsea fluid transfer of claim 1, wherein the plurality of fluid ports comprises an exposed portion through the stab body, the exposed portion comprising a flat face port.

6. A remotely operated vehicle (ROV) operated fluid stab system for subsea fluid transfer, comprising:
   a. a fluid connector receptacle comprising a fluid connector receptacle tapered entry; and
   b. a stab body configured to be removably docked into and out from a fluid receptacle, the stab body comprising:
      i. a flange, comprising a predetermined geometric shape usable to guide an orientation of a stabbing operation by separating "up" and "down" orientations;
      ii. a first surface;
      iii. a second surface disposed opposite the first surface;
      iv. a set of stab body threaded receivers extending from the first surface into the stab body;
      v. a leading portion configured to allow it to be selectively docked into and undocked from the fluid connector receptacle, the leading portion comprising:
         1. a leading edge defining a tapered receptacle entry end configured to be received into the fluid connector receptacle tapered entry; and
         2. a leading portion internal fluid annulus;
      vi. a trailing portion extending from the leading portion, the trailing portion comprising:
         1. a trailing portion internal fluid annulus in fluid communication with the leading portion internal fluid annulus; and
         2. a trailing portion fluid port in fluid communication with the trailing portion internal fluid annulus;
      vii. a predetermined set of first fluid flow rate flat face ports disposed proximate an outer surface of the trailing portion;
      viii. a predetermined set of first fluid flow rate internal fluid ports disposed between an outer surface of the leading portion and the leading portion internal fluid annulus, the first fluid flow rate internal fluid ports in fluid communication with the first fluid flow rate flat face ports and configured for a first fluid flow rate;

ix. a predetermined set of second fluid flow rate flat face ports disposed at the outer surface of the trailing portion;

x. a set of second fluid flow rate internal fluid ports disposed between the outer surface of the leading portion and the leading portion internal fluid annulus, the second fluid flow rate internal fluid ports in fluid communication with the predetermined set of second fluid flow rate flat face ports and configured for a second fluid flow rate which is lower than the first fluid flow rate;

xi. a predetermined set of check seals disposed at least partially within the set of stab body threaded receivers, the predetermined set of check seals comprising:
1. a predetermined set of second fluid flow rate check seals; and
2. a predetermined set of first fluid flow rate check seals;

xii. a plug disposed proximate to, and secured to, the trailing portion of the stab body proximate a second fluid flow rate internal fluid port of the predetermined set of second fluid flow rate flat face ports, the plug configured to occlude fluid flow through the second fluid flow rate internal fluid port disposed proximate the trailing portion;

xiii. a remotely operated vehicle ("ROV") handle non-axially-centrally connected to the trailing portion with respect to a diameter of the trailing portion to avoid intersection between a bolt hole, the second subset of the predetermined first set of first fluid flow rate flat face ports disposed at an outer surface of the trailing portion, and the second subset of the predetermined first set of second fluid flow rate flat face ports disposed at the outer surface of the trailing portion;

xiv. a flexible joint disposed intermediate the ROV handle and the plug; and xv. a rough surface protection cover.

7. The remotely operated vehicle (ROV) operated fluid stab system for subsea fluid transfer of claim 6, wherein the trailing portion is rotatably connected to the leading portion.

8. The remotely operated vehicle (ROV) operated fluid stab system for subsea fluid transfer of claim 6, wherein the flange geometric shape comprises a nonsymmetric shape.

9. The remotely operated vehicle (ROV) operated fluid stab system for subsea fluid transfer of claim 6, further comprising a seal protector comprising a seal nut comprising a predetermined set of internal threads to secure a complimentarily threaded check valve and a threaded insert configured to be threaded into a stab body threaded receiver, wherein:
a. the seal protector is adapted to ensure that a seal protected by the seal protector cannot move; and
b. the seal is adapted to reduce ingress of water into an ROV system by reducing a volume of trapped water between the complimentarily threaded check valve and the fluid connector receptacle.

10. The remotely operated vehicle (ROV) operated fluid stab system for subsea fluid transfer of claim 6, wherein:
a. the predetermined set of first fluid flow rate flat face ports comprises a predetermined set of first fluid flow rate British Standard Parallel Pipe (BSPP) flat face ports; and b. the predetermined set of second fluid flow rate flat face ports comprises a predetermined set of second fluid flow rate BSPP flat face ports.

11. The remotely operated vehicle (ROV) operated fluid stab system for subsea fluid transfer of claim 6, wherein the predetermined set of check seals is mounted in the set of stab body threaded receivers and adapted to prevent intrusion of water into the system when not pressurized and leakage of hydraulic fluids into surroundings when pressurized, the seal comprising a face seal, at least one check seal of the predetermined set of check seals comprising:
a. a check valve;
b. a housing fastened to an outside of the check seal to constrain it to the stab body;
c. a plurality of face seals defining a leakage barrier, each face seal of the plurality of face seals comprising:
i. a first face seal adapted to mate with the stab body; and
ii. a second face seal adapted to mate with the fluid connector receptacle, the second face seal comprising a compressible material that compresses when the stab body is mated, the second face seal configured to provide necessary friction to hold the stab body in place;
d. a spring; and
e. a cone shaped pin (307).

12. The remotely operated vehicle (ROV) operated fluid stab system for subsea fluid transfer of claim 11, wherein the housing comprises a hexagonally shaped head.

13. The remotely operated vehicle (ROV) operated fluid stab system for subsea fluid transfer of claim 6, wherein the fluid connector receptacle comprises:
a. a first plate comprising a first set of receptacle fluid ports configured to align with the predetermined first set of first fluid flow rate flat face ports and the predetermined second set of second fluid flow rate flat face ports;
b. a second plate comprising a second set of receptacle fluid ports configured to align with the predetermined first set of first fluid flow rate flat face ports and the predetermined second set of second fluid flow rate flat face ports; and
c. a predetermined set of spacers disposed intermediate, and connected to, the first plate and the second plate, the first plate and the second plate defining a tapered entry to guide and ease a stabbing operation, the predetermined set of spacers comprising a set of radial seals in a center of a spacer adapted to guide a stabbing operation and push back a surface cover.

14. The remotely operated vehicle (ROV) operated fluid stab system for subsea fluid transfer of claim 13, wherein the first plate and the second plate define a 15° tapered entry.

15. The remotely operated vehicle (ROV) operated fluid stab system for subsea fluid transfer of claim 6, wherein:
a. the set of first fluid flow rate internal fluid ports comprises three first fluid flow rate internal fluid ports; and
b. the set of second fluid flow rate internal fluid ports comprises ten second fluid flow rate internal fluid ports.

16. The remotely operated vehicle (ROV) operated fluid stab system for subsea fluid transfer of claim 6, wherein the stab body is adapted to achieve a roughness average ("Ra") of 1.6 at surfaces mating with fluid connector receptacle and the stab body.

17. The remotely operated vehicle (ROV) operated fluid stab system for subsea fluid transfer of claim 6, wherein the stab body comprises a nitrogen-strengthened austenitic stainless steel.

18. The remotely operated vehicle (ROV) operated fluid stab system for subsea fluid transfer of claim 6, wherein the fluid connector receptacle is galling resistant with at least 1000 mate/demate cycles and comprises:

a. a pitting resistance equivalence number greater than 40;

b. a cathodic protection connector; and c. super duplex stainless steel with a microstructure of 50:50 austenite and ferrite.

19. A method of using a remotely operated vehicle (ROV) operated fluid stab for subsea fluid transfer using a remotely operated vehicle (ROV) operated fluid stab system for subsea fluid transfer, comprising a stab body configured to be removably docked into and out from a fluid receptacle, the stab body comprising a flange comprising a predetermined geometric shape usable to guide an orientation of a stabbing operation by separating "up" and "down" orientations, a first surface, a second surface disposed opposite the first surface, a set of stab body threaded receivers extending from the first surface into the stab body a leading portion, comprising a leading edge defining a tapered receptacle entry end and a leading portion internal fluid annulus, a trailing portion connected to the leading portion, the trailing portion comprising a trailing portion internal fluid annulus in fluid communication with the leading portion internal fluid annulus and a trailing portion fluid port in fluid communication with the trailing portion internal fluid annulus, a predetermined set of first fluid flow rate flat face ports disposed at an outer surface of the trailing portion, a predetermined set of first fluid flow rate internal fluid ports disposed between the outer surface of the leading portion and the leading portion internal fluid annulus where the first fluid flow rate internal fluid ports are in fluid communication with the first fluid flow rate flat face ports and configured for a first fluid flow rate, a predetermined set of second fluid flow rate flat face ports disposed at the outer surface of the trailing portion, a set of second fluid flow rate internal fluid ports disposed between the outer surface of the leading portion and the leading portion internal fluid annulus, the second fluid flow rate internal fluid ports in fluid communication with the predetermined set of second fluid flow rate flat face ports and configured for a second fluid flow rate which is lower than the first fluid flow rate, a predetermined set of check seals disposed at least partially within the set of stab body threaded receivers, the predetermined set of check seals comprising a predetermined set of second fluid flow rate check seals and a predetermined set of first fluid flow rate check seals, a plug disposed proximate to, and secured to, the trailing portion of the stab body proximate a second fluid flow rate internal fluid port of the predetermined set of second fluid flow rate flat face ports disposed proximate the trailing portion, the plug configured to occlude fluid flow through the second fluid flow rate internal fluid port disposed proximate the trailing portion, a remotely operated vehicle ("ROV") handle non-centrally connected to the trailing portion with respect to a diameter of the trailing portion to avoid intersection between a bolt hole, the second subset of the predetermined first set of first fluid flow rate flat face ports disposed at an outer surface of the trailing portion, and the second subset of the predetermined first set of second fluid flow rate flat face ports disposed at the outer surface of the trailing portion, a flexible joint disposed intermediate the ROV handle and the plug, a rough surface protection cover and a set of fluid connectors; and a fluid connector receptacle configured to allow the leading portion of the stab body to be selectively docked into and undocked from the fluid connector receptacle, the method comprising:

a. guiding the stab body by its tapered receptacle entry end into the fluid connector receptacle;

b. using the flange to indicate that a successful stab depth is reached when the flange is parallel to a receptacle outer face;

c. routing a predetermined set of cables away from the stab body and into separate spiral covers;

d. securing the seal in place by a seal nut that is threaded into the stab body, the seal nut comprising internal threads for a check valve; and e. sliding the protection cover over the seal to shield the seal from external forces when the stab body is not docked in the fluid connector receptacle.

20. The method of using a remotely operated vehicle (ROV) operated fluid stab for subsea fluid transfer of claim 19, wherein the fluid connector receptacle comprises a first plate comprising a set of receptacle fluid ports configured to align with the predetermined set of first fluid flow rate flat face ports and the predetermined set of second fluid flow rate flat face ports, a second plate comprising a set of receptacle fluid ports configured to align with the predetermined set of first fluid flow rate flat face ports and the predetermined set of second fluid flow rate flat face ports, a predetermined set of spacers disposed intermediate, and connected to, the first plate and the second plate where the first plate and the second plate define a tapered entry to guide and ease a stabbing operation and where the predetermined set of spacers comprise a set of radial seals in a center a spacer adapted to guide a stabbing operation and push back a surface cover, the method further comprising fitting the spacers with the radial seals.

\*    \*    \*    \*    \*